April 3, 1928.                                                1,664,419
W. B. JACKMAN
DENTAL ACID CONTAINER
Filed Nov. 5, 1925

Inventor,
William B. Jackman,
by Geyer & Geyer
Attorneys.

Patented Apr. 3, 1928.

1,664,419

UNITED STATES PATENT OFFICE.

WILLIAM B. JACKMAN, OF NIAGARA FALLS, NEW YORK.

DENTAL ACID CONTAINER.

Application filed November 5, 1925. Serial No. 67,109.

This invention relates to an acid dish or container which is more particularly intended for use by dentists in the annealing treatment of inlays, gold crowns and other parts.

As heretofore constructed, these acid dishes simply had a flat-bottomed cavity which made it exceedingly difficult to locate and fish out the parts immersed in the acid, particularly after the acid became darkened in color by repeated use.

It is the principal object of my invention to provide a container of this character which is so constructed that it causes the object or objects immersed therein to assume a definite predetermined location or position, thereby facilitating their ready removal.

Another object is to provide an acid dish which is simple and inexpensive in construction and which effects a material saving of time in this particular branch of the dentist's work.

Figure 1:
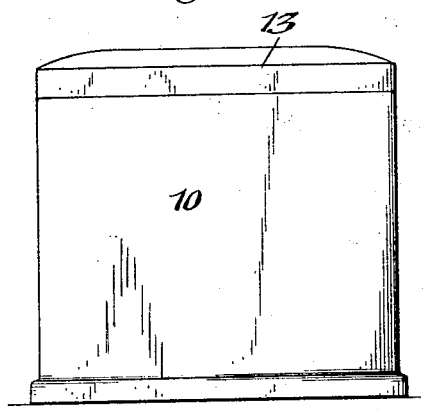
Figure 3:
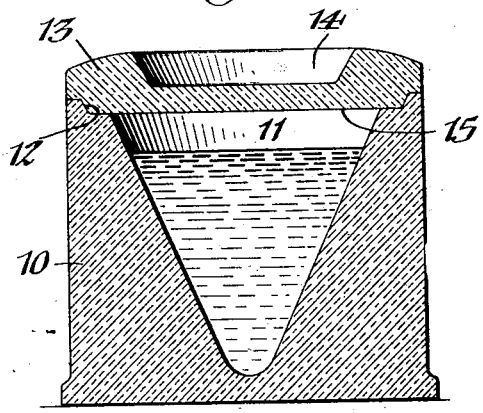
Figure 2:
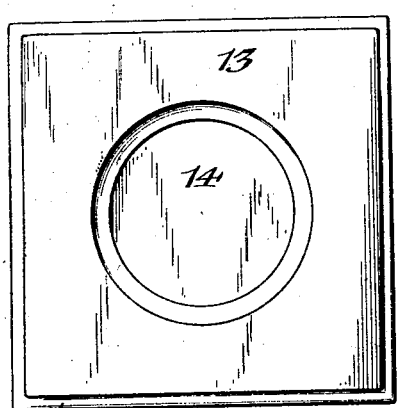
Figure 4:
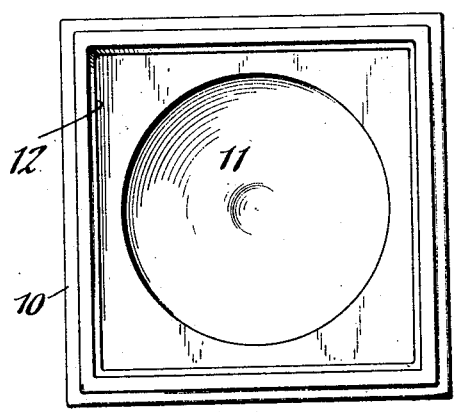
Figure 5:
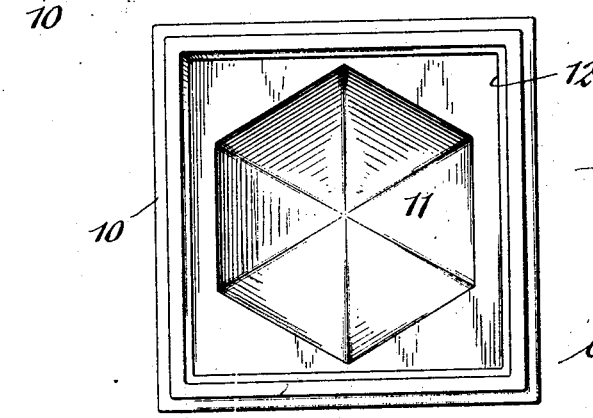

In the accompanying drawings:

Figure 1 is a side elevation of an acid container embodying my invention. Figure 2 is a top plan view thereof. Figure 3 is a cross section of the same. Figure 4 is a top plan view of the container-body with the cover removed. Figure 5 is a similar view of a modified form of the invention.

Similar characters of reference indicate corresponding parts throughout the several views.

In the preferred embodiment of the dish or container shown in Figs. 1–4 inclusive, the same consists of a body 10, of glass, porcelain or similar acid-resisting material, having a cavity or opening 11 for receiving the acid. As shown, this cavity is of inverted, conical form with its bottom or tapered end disposed substantially centrally of the container body. At its top and surrounding said cavity, the body has a marginal recess or rabbet 12 in which a suitable cover 13 is removably seated. The latter is provided in its top with a pocket or shallow cavity 14 for receiving a flux which is utilized in the annealing treatment of the dental parts. The bottom face 15 of the cover is flat to insure its lying flatwise on the table.

By constructing an acid dish of this character with the cavity having downwardly-converging side walls, the object immersed in the acid will always seek a predetermined position at the junction or intersection of the cavity-walls, enabling the dentist to directly and readily fish out the article being treated without having to search blindly over an extensive area with a resulting material loss of time.

If desired, the cavity, instead of being of conical form, may be of inverted pyramidal or equivalent form, as shown in Fig. 5.

I claim as my invention:—

A dental acid dish, comprising a body having an acid-receiving cavity having a wide mouth, the side walls of the cavity converging downwardly substantially to a point to cause an article immersed in the acid to always seek a predetermined position at the junction of the cavity-walls, whereby the dentist is enabled to directly fish out the article being treated without having to search blindly over an extensive area.

WILLIAM B. JACKMAN.